United States Patent [19]
Hartmann et al.

[11] Patent Number: 5,578,678
[45] Date of Patent: *Nov. 26, 1996

[54] GRAFT POLYMERS OF NATURAL SUBSTANCES CONTAINING SACCHARIDE STRUCTURES OR DERIVATIVES THEREOF AND ETHYLENICALLY UNSATURATED COMPOUNDS AND THEIR USE

[75] Inventors: Heinrich Hartmann, Limburgerhof; Walter Denzinger, Speyer; Michael Kroener, Mannheim; Claudia Nilz, Dannstadt-Schauernheim; Friedrich Linhart, Heidelberg; Andreas Stange, Mannheim, all of Germany

[73] Assignee: BASF Aktiengesellschaft, Ludwigshafen, Germany

[ * ] Notice: The portion of the term of this patent subsequent to Aug. 2, 2011, has been disclaimed.

[21] Appl. No.: 229,636

[22] Filed: Apr. 19, 1994

Related U.S. Application Data

[63] Continuation of Ser. No. 914,926, Jul. 17, 1992.

[30] Foreign Application Priority Data

Aug. 22, 1991 [DE] Germany .......................... 41 27 733.3

[51] Int. Cl.$^6$ .......................... C08F 251/00; D21H 21/06; D21H 21/10
[52] U.S. Cl. .................... 525/54.3; 525/54.31; 527/305; 527/306; 527/312; 527/313
[58] Field of Search ........................ 527/305, 306, 527/312, 313; 525/54.3, 54.31

[56] References Cited

U.S. PATENT DOCUMENTS

| | | | |
|---|---|---|---|
| 2,276,840 | 3/1942 | Hanford et al. | 526/259 |
| 3,770,673 | 11/1973 | Slagel et al. | |
| 3,775,400 | 11/1973 | Wurzburg et al. | 536/46 |
| 4,713,236 | 12/1987 | Hoover et al. | 424/70 |
| 4,818,341 | 4/1989 | Degen et al. | |
| 4,880,497 | 11/1989 | Pfohl et al. | |
| 4,978,427 | 12/1990 | Pfohl et al. | |
| 5,122,568 | 6/1992 | Depierne et al. | |
| 5,227,446 | 7/1993 | Denzinger et al. | |
| 5,334,287 | 8/1994 | Hartmann et al. | 162/175 |

*Primary Examiner*—Jeffrey C. Mullis
*Attorney, Agent, or Firm*—Oblon, Spivak, McClelland, Maier & Neustadt, P.C.

[57] ABSTRACT

Graft polymers are obtainable by free radical polymerization of
(A) monomers or monomer mixtures of
   (a) from 10 to 100% by weight of open-chain N-vinyl-carboxamides
   (b) from 0 to 90% by weight of other, carboxyl-free monoethylenically unsaturated monomers which are copolymerizable with the monomers (a) and
   (c) from 0 to 5% by weight of monomers containing two or more ethylenically unsaturated, non-conjugated double bonds in the molecule,
in the presence of
(B) natural substances containing saccharide structures, such as mono-, oligo- and polysaccharides,
in a weight ratio (A):(B) of from 95:5 to 20:80 and, if required, subsequent hydrolysis of the amido groups of the polymerized monomers (a) of the graft polymer with formation of amino groups, and said polymers are used as dry and wet strength agents for paper, board and cardboard.

12 Claims, No Drawings

GRAFT POLYMERS OF NATURAL SUBSTANCES CONTAINING SACCHARIDE STRUCTURES OR DERIVATIVES THEREOF AND ETHYLENICALLY UNSATURATED COMPOUNDS AND THEIR USE

This is a continuation, of application Ser. No. 07,914,926, filed on Jul. 17, 1992.

The present invention relates to graft polymers of natural substances containing saccharide structures or derivatives thereof and open-chain N-vinylcarboxamides and the use of the graft polymers as dry and wet strength agents in the production of paper, board and cardboard.

U.S. Pat. No. 4,880,497 and U.S. Pat. No. 4,978,427 each disclose the production of paper having high dry strength and wet strength, in which a hydrolyzed copolymer which is obtainable by copolymerization of N-vinylformamide and ethylenically unsaturated monomers, for example vinyl acetate, vinyl propionate or alkyl vinyl ethers, and hydrolysis of from 30 to 100 mol % of the formyl groups of the copolymer with formation of amino groups is used as a strength agent, either on the surface of the paper or in the paper stock prior to sheet formation. The hydrolyzed copolymers are used in amounts of from 0.1 to 5% by weight, based on dry fibers.

It is an object of the present invention to provide novel substances. It is a further object of the present invention to provide economical wet and dry strength agents for paper, board and cardboard, which agents can be prepared by partly using renewable raw materials.

We have found that this object is achieved, according to the invention, by graft polymers of natural substances containing saccharide structures or derivatives thereof and ethylenically unsaturated compounds, which are obtainable by free radical polymerization of (A) monomers or monomer mixtures of
   (a) from 10 to 100% by weight of N-vinylcarboxamides of the formula

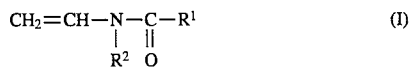

where $R^1$ and $R^2$ are each H or $C_1$–$C_6$-alkyl,
   (b) from 0 to 90% by weight of other carboxyl-free monoethylenically unsaturated monomers which are copolymerizable with monomers (a) and
   (c) from 0 to 5% by weight of monomers containing two or more ethylenically unsaturated, non-conjugated double bonds in the molecule, in the presence of (B) monosaccharides, oligosaccharides, polysaccharides, oxidatively, hydrolyrically or enzymatically degraded polysaccharides, oxidized hydrolyrically degraded or oxidized enzymatically degraded polysaccharides, chemically modified mono-, oligo- or polysaccharides or a mixture of the stated compounds in a weight ratio (A):(B) of from 95:5 to 20:80 and, if necessary, subsequent elimination of the group

from the polymerized monomers (a) of the graft polymer with formation of units of the formula

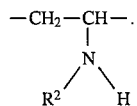

N-Vinylformamide is preferably used as monomer (A). In a further process step, from 2 to 100%, preferably from 30 to 95%, of the formyl groups of the polymerized N-vinylformamide are eliminated from the resulting graft polymers with formation of units of the formula

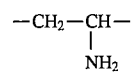

Preferably used monomer mixtures consist of from 1 to 99% by weight of N-vinylformamide and from 99 to 1% by weight of vinyl acetate. From 2 to 100%, preferably from 30 to 95%, of the formyl groups of the polymerized N-vinylformamide and from 2 to 100% of the acetate groups of the polymerized vinyl acetate are eliminated from the resulting graft polymers. The hydrolyzed graft polymers thus obtained are used as dry and wet strength agents for paper, board and cardboard.

Suitable monomers for the preparation of graft polymers of N-vinylcarboxamides of the formula

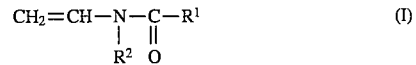

where $R^1$ and $R^2$ may be identical or different and are each hydrogen or $C_1$–$C_6$-alkyl. Examples of suitable monomers are N-vinylformamide ($R^1$ and $R^2$ are each H in the formula I), N-vinyl-N-methylformamide, N-vinylacetamide, N-vinyl-N-methylacetamide, N-vinyl-N-ethylacetamide, N-vinyl-N-methylpropionamide and N-vinylpropionamide. For the preparation of the graft polymers, the stated monomers can be used either alone or as a mixture with one another. N-Vinylformamide is preferably used from this group of monomers.

The abovementioned N-vinylcarboxamides can, if required, be used in the graft polymerization together with other carboxyl-free monoethylenically unsaturated monomers which are copolymerizable therewith. Examples of suitable monomers of group (b) are vinyl esters of saturated carboxylic acids of 1 to 6 carbon atoms, eg. vinyl formate, vinyl acetate, vinyl propionate and vinyl butyrate. The esters, amides and nitriles of monoethylenically unsaturated $C_3$–$C_6$-carboxylic acids are also suitable. Examples of suitable amides are acrylamide, methacrylamide and N-alkyl-monoamides and -diamides where the alkyl radicals are of 1 to 6 carbon atoms, eg. N-methylacrylamide, N,N-dimethylacrylamide, N-methylmethacrylamide, N-ethylacrylamide, N-propylacrylamide and tert-butylacrylamide, and the basic (meth)acrylamides thereof, such as dimethylaminoethylacrylamide, dimethylaminoethylmethacrylamide, diethylaminoethylacrylamide, diethylaminoethylmethacrylamide, dimethylaminopropylacrylamide, diethylaminopropylacrylamide, dimethylaminopropylmethacrylamide and diethylaminopropylmethacrylamide. The esters of the monoethylenically unsaturated carboxylic acids with $C_1$–$C_6$-alcohols, eg. methyl acrylate, methyl methacrylate, ethyl acrylate and ethyl methacrylate, or with glycols or polyglycols, in each case only one OH group of the glycols and polyglycols being esterified with an ethylenically unsaturated carboxylic acid, eg. hydroxyethyl acrylate, hydroxyethyl methacrylate, hydroxypropyl acrylates, hydroxybutyl acrylates, hydroxypropyl methacrylates, hydroxybutyl methacrylates and the monoesters of acrylic acid with polyalkylene glycols having a molecular weight of from 1,500 to 10,000, are also useful. The esters of ethylenically unsaturated carboxylic acids with aminoalcohols, eg. dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate, diethylaminopropyl methacrylate, dimethylaminobutyl acrylate, diethylaminobutyl acrylate, dnethylaminopentyl acrylate, dimethylaminoneopentyl methacrylate and dimethylaminohexyl acrylate, are furthermore suitable. The basic acrylates and acrylamides are used in the form of the free bases or of the salts with mineral acids, for example hydrochloric acid, sulfuric acid or nitric acid or in quaternized form. (Suitable quaternizing agents are, for example, dimethyl sulfate, methyl chloride, ethyl chloride, benzyl chloride and diethyl sulfate).

Other suitable monomers of group (b) are N-vinylpyrrolidone, N-vinylcaprolactam, acrylonitrile, methacrylonitrile, N-vinylimidazole and substituted N-vinylimidazoles, eg. N-vinyl-2-methylimidazole, N-vinyl-4-methylimidazole, N-vinyl-5-methylimidazole or N-vinyl-2-ethylimidazole, and N-vinylimidazolines, such as N-vinylimidazoline, N-vinyl-2-methylimidazoline and N-vinyl-2-ethylimidazoline. N-Vinylimidazoles and N-vinylimidazolines are used not only in the form of the free bases but also in a form neutralized with mineral acids or in quaternized form, quaternization preferably being effected with dimethyl sulfate, diethyl sulfate, benzyl chloride, methyl chloride or ethyl chloride.

Sulfo-containing monomers, for example vinylsulfonic acid, allylsulfonic acid, methallylsulfonic acid, styrenesulfonic acid, 3-sulfopropyl acrylate, 3-sulfopropyl methacrylate and 2-acrylamido-2-methyl-propanesulfonic acid, are also suitable as monomers (b).

Among the monomers (b), vinyl acetate and vinyl propionate are preferred.

In the preparation of the graft polymers, monomer mixtures of from 10 to 100% by weight of one or more monomers of group (a) and from 0 to 90% by weight of one or more monomers of the group (b) are used.

A further modification of the graft copolymers may be achieved if the monomer mixtures contain up to 5% by weight of a monomer (c) having two or more ethylenically unsaturated nonconjungated double bonds in the molecule. These compounds are usually used in the copolymerizations as crosslinking agents. They may be added to the monomer mixtures of (a) and (b) which are used for the copolymerization. When they are used, the preferably used amount is from 0.05 to 2% by weight. The presence of the monomers of group (c) during the copolymerization results in an increase in the K values of the copolymers. Suitable compounds of this type are, for example, methylenebisacrylamide, esters of acrylic acid and methacrylic acid with polyhydric alcohols, eg. glycol diacrylate, glyceryl triacrylate, glycol dimethacrylate or glyceryl trimethacrylate, and polyols which are diesterified or polyesterified with acrylic acid or methacrylic acid, such as pentaerythritol and glucose. Other suitable crosslinking agents are divinylbenzene, divinyldioxane, pentaerythrityl triallyl ether and pentaallylsucrose. Water-soluble monomers, such as glycol diacrylate or glycol diacrylates of polyethylene glycols having a molecular weight of up to 3,000, are preferably used from this group of compounds.

The polymerization of monomers (a) and (b) and, if required, additionally (c) is carried out in the presence of natural substances based on polysaccharides, oligosaccharides, monosaccharides and derivatives thereof. The natural substances are, for example, saccharides of vegetable or animal origin or products of metabolism of microorganisms and their degradation and modification products, which are dispersible or soluble in water or alkalis or become soluble or dispersible during the polymerization of the monomers (a) and (b) and, if required, (c), directly or in a form partially or completely neutralized with alkalis, ammonia or amines.

These are, for example, pectin, algin, chitin, chitosan, heparin, carrageenan, agar, gum arabic, tragacanth, karaya gum, ghatti gum, carob bean flour, guar gum, tara gum, inulin, xanthan, dextran, nigeran and pentosans, such as xylan and araban, the main components of which consist of D-glucuronic acid, D-galacturonic acid, methyl D-galacturonate, D-mannuronic acid, L-guluronic acid, D- and L-galactose, 3,6-anhydro-D-galactose, L-arabinose, L-rhamnose, D-glucuronic acid, D-xylose, L-fucose, D-mannose, D-fructose and D-glucose, 2-amino-2-deoxy-D-glucose and 2-amino-2-deoxy-D-galactose and N-acetyl derivatives thereof.

From the economic point of view, preferably used polysaccharides in the polymerization are starch, thermally and/or mechanically treated starch, oxidatively, hydrolytically or enzymatically degraded starches, oxidized hydrolytically degraded or oxidized enzymatically degraded starches and chemically modified starches and chemically modified monosaccharides and oligosaccharides. In principle, all starches are suitable. However, starches obtained from corn, wheat, rice and tapioca and in particular potato starch are preferred. The starches are virtually water-insoluble and can be converted into a water-soluble form in a known manner by thermal and/or mechanical treatment or by enzymatic or acid-catalyzed degradation. Examples of starch degradation products which are obtainable either by oxidative, hydrolytic or enzymatic degradation of starch are the following compounds: dextrins, such as white and yellow dextrins, maltodextrins, glucose syrups, maltose syrups, hydrolysis products having a high content of D-glucose, and maltose and D-glucose and its isomerization product fructose. Of course, mono- and oligosaccharides, such as galactose, mannose, ribose, sucrose, raffinose, lactose and trehalose, and degradation products of cellulose, for example cellubiose and its oligomers, are also suitable.

Colorless or only slightly yellow aqueous solutions of the graft polymers are obtained in particular when starches degraded under acid catalysis or enzymatically are used as component (B). Such degraded starches are commercially available under the name starch conversion product. They contain from 0.5 to 95, preferably from 8 to 20, % by weight of dextrose and from 3 to 30, preferably from 5 to 20, % by weight of maltose, from 2 to 90% by weight of maltotriose and higher sugars.

Other suitable components (B) are oxidized starches, for example dialdehyde starch, and oxidized starch degradation products, for example gluconic acid, glucaric acid and glucuronic acid. Such compounds are obtained, for example, by oxidizing starch with periodate, chromic acid, hydrogen peroxide, nitrogen dioxide, nitrogen tetroxide, nitric acid or hypochlorite.

Further suitable components (B) are chemically modified polysaccharides, in particular chemically modified starches, for example starch degradation products and starches reacted with acids to give esters and with alcohols to give ethers. The esterification of these substances is possible both with inorganic and with organic acids or their anhydrides or chlorides. In the direct esterification, the water liberated leads to an acid-catalyzed cleavage of glycosidic bonds.

Phosphated and acetylated starches and starch degradation products are of particular industrial interest. The most common method for etherification of starch is the treatment of the starch and of the starch degradation products with organic halogen compounds, epoxides or sulfates in aqueous alkaline solution. Starch ethers are, for example, the alkyl ethers, hydroxyalkyl ethers, carboxyalkyl ethers and allyl ethers of starch. Chemically modified starches for component (B) are intended to include cationically modified starches, for example starches reacted with 2,3-epoxypropyltrimethylammonium chloride, as described in, for example, U.S. Pat. No. 3,649,616.

Chemically modified polysaccharides include, for example, carboxymethylcellulose, hydroxyethylcellulose, hydroxypropylcellulose carboxymethylhydroxyethylcellulose, sulfoethylcellulose, carboxymethylsulfoethylcellulose, hydroxypropylsulfoethylcellulose, hydroxyethylsulfoethylcellulose, methylsulfoethylcellulose and ethylsulfoethylcellulose.

Particularly suitable components (B) are chemically modified degraded starches, for example hydrogenation products of starch hydrolysis products, such as sorbitol and mannitol, maltitol and in particular hydrogenated glucose syrups, because these make it possible to prepare colorless graft copolymers which do not become decolorized even on prolonged storage. Oxidized hydrolytically degraded or oxidized enzymatically degraded starches are also suitable as component (B).

The products of the acid-catalyzed or enzymatic transglycosidation or glycosidation, for example methyl glucoside, are likewise suitable.

For the preparation of the polymers, the monomers (a) and (b) and, if required, (c) are subjected to free radical polymerization in the presence of compounds of component (B). In certain cases, it may be advantageous for the reaction of the resulting polymer to use two or more of the compounds stated under (B), for example mixtures of hydrolytically or enzymatically degraded starches and gluconic acid, mixtures of a monosaccharide and an oligosaccharide, mixtures of an enzymatically degraded starch and a monosaccharide or mixture of glucose and sucrose and mannose. The polymerization can be carried out in the presence or absence of inert solvents or inert diluents. Since the polymerization in the absence of inert solvents or diluents generally leads to different polymers, the polymerization in an inert solvent or diluent is preferred. Examples of suitable inert diluents are those in which the compounds stated under (B) can be suspended and which dissolve the monomers (A). In these cases, the polymers are present in suspended form after the copolymerization and can readily be isolated in solid form by filtration. Suitable inert diluents are, for example, toluene, xylene, o-, m- and p-xylene and isomer mixtures, ethylbenzene, aliphatic hydrocarbons, such as pentane, hexane, heptane, octane, nonane, dodecane, cyclohexane, cyclooctane, methylcyclohexane and mixtures of the stated hydrocarbons or gasoline fractions which contain no polymerizable monomers. Chlorohydrocarbons, such as chloroform, carbon tetrachloride, hexachloroethane, dichloroethane and tetrachloroethane, are also suitable. In the procedure described above, in which the compounds of component (B) are suspended in an inert diluent, anhydrous compounds of component (B) are preferably used. A preferred method for the preparation of the polymers is solution polymerization, the compounds of component (B), the monomers (A) and the polymer formed being present in at least dispersed form, preferably in dissolved form. For example, inert solvents such as methanol, ethanol, isopropanol, n-propanol, n-butanol, sec-butanol, tetrahydrofuran, dioxane, water and mixtures of the stated inert solvents are suitable for the solution polymerization. The polymerization can be carried out continuously or batchwise.

The polymers are prepared in general using free radical initiators.

Preferred free radical initiators are all those compounds which have a half life of less than 3 hours at the particular polymerization temperature chosen. If the polymerization is started at a relatively low temperature and completed at a higher temperature, it is advantgeous to employ two or more initiators decomposing at different temperatures, ie. first to use an initiator which decomposes at a lower temperature to initiate the polymerization and then to complete the main polymerization using an initiator which decomposes at a higher temperature. Water-soluble or water-insoluble initiators or mixtures of water-soluble or water-insoluble initiators may be used. The water-insoluble initiators are then soluble in the organic phase. For the temperature ranges stated below, it is possible to use, for example, the initiators stated for this purpose.

Temperature: from 40° to 60° C.:
Acetylcyclohexanesulfonyl peroxide, diacetylperoxydicarbonate, dicylcohexylperoxydicarbonate, di-2-ethylhexyl peroxydicarbonate, tert-butyl perneodecanoate, 2,2-azobis-(4-methoxy-2,4-dimethylvaleronitrile), 2,2'-azobis-(2-methyl-N-phenylpropionamidine) dihydrochloride, 2,2'-azobis-(2-methylpropionamidine) dihydrochloride.

Temperature: from 60° to 80° C.:
tert-Butyl perpivalate, dioctanoyl peroxide, dilauaroyl peroxide, 2,2'-azobis-(2,4-dimethylvaleronitrile).

Temperature: from 80° to 100° C.:
Dibenzoyl peroxide, tert-butyl per-2-ethylhexanoate, tert-butyl permaleate, 2,2'-azobisisobutyronitrile, dimethyl-2,2'-azobisisobutyrate, sodium persulfate, potassium persulfate, ammonium persulfate.

Temperature: from 100° to 120° C.:
Bis-(tert-butylperoxy)-cyclohexane, tert-butyl peroxyisopropylcarbonate, tert-butyl peracetate, hydrogen peroxide.

Temperature: from 120° to 140° C.:
2,2-Bis-(tert-butylperoxy)-butane, dicumyl peroxide, di-tert-amyl peroxide, di-tert-butyl peroxide.

Temperature: 120° to 140° C.;
2,2-Bis-(tert-butylperoxy)-butane, dicumyl peroxide, di-tert-amyl peroxide, di-tert-butyl peroxide.

Temperature: >140° C.
p-Menthane hydroperoxide, pinane hydroperoxide, cumene hydroperoxide and tert-butyl hydroperoxide.

If, in addition to these stated initiators, salts or complexes of heavy metals, for example copper, cobalt, manganese, iron, vanadium, nickel and chromium salts, or organic compounds, such as benzoin, dimethylaniline or ascorbic acid, are used, the half lives of the stated free radical initiators can be reduced. For example, tert-butyl hydroperoxide may be activated with the addition of 5 ppm of copper(II) acetylacetonate to such an extent that polymerization can be effected at as low as 100° C. The reducing component of redox catalysts may also be formed, for example, by compounds such as sodium sulfite, sodium bisulfite, sodium formaldehyde sulfoxylate and hydrazine. From 0.01 to 20, preferably from 0.05 to 10, % by weight, based on the monomers used in the polymerization, of a polymerization initiator or of a mixture of a plurality of polymerization initiators are used. From 0.01 to 15% of the reducing compounds are employed as redox components. From 0.1 to 100 ppm, preferably from 0.5 to 10 ppm, of heavy metals are used. It is often advantageous to use a combination of peroxide, reducing agent and heavy metal as the redox catalyst.

The graft polymerization of the essential monomers (a) and/or (b) and of the monomers (c) which may or may not be present can also be carried out by the action of ultraviolet radiation, in the presence or absence of UV initiators. For the polymerization under the action of UV radiation, the conventional photoinitiators or sensitizers are used. These are, for example, compounds such as benzoin and benzoin ethers, α-methylbenzoin or α-phenylbenzoin. Triplet sensitizers, such as benzyl diketals, may also be used. The UV radiation sources used are, for example, high energy UV lamps, such as carbon arc lamps, mercury vapor lamps or xenon lamps, as well as low-UV light sources, such as fluorescent tubes having a substantial blue component.

In order to prepare polymers with a low K value, the polymerization is advantageously carried out in the presence of regulators. Examples of suitable regulators are mercapto compounds, such as mercaptoethanol, mercaptopropanol, mercaptobutanol, mercaptoacetic acid, mercaptopropionic acid, butyl mercaptan and dodecyl mercaptan. Other suitable regulators are allyl compounds, such as allyl alcohol, aldehydes, eg. formaldehyde, acetaldehyde, propionaldehyde, n-butyraldehyde and isobutyraldehyde, formic acid, ammonium formate, propionic acid, hydrazine sulfate and butenols. If the polymerization is carried out in the presence of regulators, from 0.05 to 20% by weight, based on the monomers used in the polymerization, of said regulators are required.

The copolymerization of the components (A) and (B) is usually carried out in an inert gas atmosphere in the absence of atmospheric oxygen. During the polymerization, thorough mixing of the reactants is generally ensured. In the case of relatively small batches where reliable removal of the heat of polymerization is ensured, the reactants, which are preferably present in an inert diluent, can be copolymerized batchwise by heating the reaction mixture to the polymerization temperature and then allowing the reaction to proceed. These temperatures are from 40° to 150° C. In order to be able better to control the course of the polymerization reaction, the monomers (A) are added continuously or batchwise to the polymerizing mixture at the desired polymerization temperature at a rate such that the polymerization is readily controllable in the desired temperature range. In a preferred method of adding the monomers of component (A), the compounds of component (B) or some of said compounds are initially taken in the polymerization reactor and are heated therein to the desired polymerization temperature while stirring. As soon as this temperature has been reached, the monomers (a, b) and, if required, (c) and the initiator and, if necessary, a regulator are added in the course of from about 1 to 10, preferably from 2 to 8, hours. Such a procedure is used, for example, in the polymerization of components (A) and (B) in an inert diluent in which component (B) is suspended and also in the polymerization carried out in solution.

The novel polymers are preferably prepared by suspension or solution polymerization of components (A) and (B) in an aqueous medium, solution polymerization in water being particularly preferred. In the solution polymerization in an aqueous medium, for example, some or all of the compounds of component (B) are initially taken in an aqueous medium and the monomers (a, b) and, if required, the monomers (c) are added continuously or batchwise to the polymerizing reaction mixture. To avoid hydrolysis of the monomeric N-vinylcarboxamides during the polymerization in aqueous solution the polymerization is preferably carried out at a pH of from 4 to 9, in particular from 5 to 8. In many cases, it is advisable additionally to work in the presence of buffers, for example to add primary or secondary sodium phosphate to the aqueous phase. When monomers (b) containing acid groups are used, they are employed in the form of the salts.

As stated above, polysaccharides can be subjected to the polymerization in aqueous suspension. However, graft polymers are preferably prepared by first converting a water-insoluble polysaccharide in aqueous suspension, with the addition of enzymes and/or acids, into a water-soluble form and subjecting the monomers (A) to the graft polymerization in the resulting aqueous solution of the degraded polysaccharides. A water-insoluble polysaccharide, for example potato starch, is first suspended in water and is degraded. This degradation can be effected with the action of enzymes, for example α- or β-amylase or of debranching enzymes, for example pullulanase, or by the action of inorganic or organic acids, in a known manner. Examples of suitable inorganic acids are phosphoric acid, sulfuric acid, hydrochloric acid and nitric acid. Suitable organic acids are, for example, saturated or unsaturated carboxylic acids, such as formic acid, acetic acid, propionic acid, maleic acid, itaconic acid, p-toluenesulfonic acid and benzenesulfonic acid.

The enzymatic degradation of starch is carried out in at from 30° to 120° C., while the hydrolytic degradation of starch is effected at from 50° to 150° C. From about 5 minutes to 10 hours are required for the hydrolytic degradation, the degree of hydrolytic degradation of the starch being dependent on the temperature chosen, on the pH and the time. For further information on the degradation of starch, reference may be made to the technical literature, for example Güther Tegge, Stärke und Stärkederivate, Behr's Verlag, Hamburg 1984.

In the graft polymerization, the temperatures are usually from 40° to 180° C., preferably from 50° to 150° C., in particular from 60° to 110° C. As soon as the temperature in the graft polymerization is above the boiling points of the inert diluent or solvent or of the monomers, the polymerization is carried out under pressure. The concentration of components (A) and (B) in the graft polymerization in the presence of inert solvents or inert diluents is from 10 to 80, preferably from 20 to 70, % by weight. Graft polymers can be prepared in conventional polymerization apparatuses. For example, stirred kettles which are equipped with an anchor, paddle or impeller stirrer or with a multistage impulse counter-current agitator are used for this purpose. Particularly in the polymerization in the absence of diluents, it may be advantageous to carry out the polymerization in a kneader. It may furthermore be necessary to effect polymerization in a kneader if high concentrations are used or if the natural substances have high molecular weights and initially exhibit substantial swelling.

Graft polymers which, if they are soluble in water, have K values of from 8 to 250, preferably from 10 to 150 (measured in 1% strength aqueous solutions of copolymers at pH 7 and at 25° C.), are obtained. The graft polymers which can be prepared by the abovementioned processes are colorless to brownish products. During the polymerization, they are present in an aqueous medium as dispersions or polymer solutions. Depending on the particular composition of the graft polymers, low-viscosity to pasty aqueous solutions or aqueous dispersions are obtained.

The graft polymers thus obtainable can be used directly as dry and wet strength agents for paper. However, their efficiency can be increased if the group

is eliminated from the polymerized monomers (a) of the graft polymer with formation of units of the formula

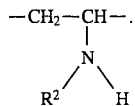

The preparation of the graft polymers is therefore preferably followed by a second process stage in which hydrolysis is carried out under the action of acids or bases. The polymers contain 10% by weight or more of typical units of the formula

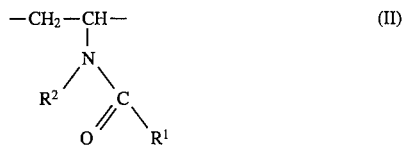

where $R^1$ and $R^2$ are each H or $C_1$–$C_6$-alkyl. The units II are converted by hydrolysis into units of the formula

where $R^2$ is H or $C_1$–$C_6$-alkyl. Depending on the reaction conditions during the hydrolysis, ie. the amount of acid or base, based on the polymer to be hydrolyzed, and the reaction temperature during the hydrolysis, either partial or complete hydrolysis of the units of the formula (II) occurs. The hydrolysis of the graft polymers is carried out until from 2 to 100%, preferably from 30 to 95%, of the monomer units of the formula (II) which are present in the graft polymers have been hydrolyzed. For the hydrolysis, an acid or base is added to the graft polymers prepared in the first process stage. Examples of suitable acids are mineral acids, such as hydrogen halide (in gaseous form or in aqueous solution), sulfuric acid, nitric acid or phosphoric acid (ortho-, meta- or polyphosphoric acid), and organic acids, for example $C_1$–$C_5$-carboxylic acids, such as formic acid, acetic acid and propionic acid, or the aliphatic or aromatic sulfonic acids, such as methanesulfonic acid, benzenesulfonic acid or toluenesulfonic acid. Hydrochloric acid or sulfuric acid is preferably used for the hydrolysis. In the hydrolysis with acids, the pH is from 0 to 5. From 0.05 to 1.5, preferably from 0.4 to 1.2, equivalents of acid are required per equivalent of formyl groups in the polymer.

In the hydrolysis with bases, hydroxides with metals of the first and second main groups of the Periodic Table may be used, for example lithium hydroxide, sodium hydroxide, potassium hydroxide, calcium hydroxide, strontiumhydroxide and barium hydroxide being suitable. However, ammonia and alkyl derivatives of ammonia may also be used, for example alkyl- or arylamines, eg. triethylamine, monoethanolamine, diethanolamine, triethanolamine, morpholine or aniline. In the hydrolysis with bases, the pH is from 8 to 14. The bases can be used in the solid, liquid or, if necessary, gaseous state, diluted or undiluted. Preferably used bases for the hydrolysis are ammonia, sodium hydroxide solution and potassium hydroxide solution. The hydrolysis in the acidic or alkaline pH range is carried out at from 30° to 170° C., preferably from 50° to 120° C. It is complete after from about 2 to 8, preferably from 3 to 5, hours. After these reaction times degrees of hydrolysis of the units of the formula (II) in the polymer of from 2 to 100% are achieved. A procedure in which the bases or acids are added in aqueous solution for the hydrolysis has proven particularly useful. After the hydrolysis, neutralization is generally effected so that the pH of the hydrolyzed polymer solution is from 2 to 8, preferably from 3 to 7. The neutralization is required when it is intended to avoid or delay continuing hydrolysis of partially hydrolyzed polymers.

Particularly preferred graft polymers are those which are prepared using, as monomer (A), N-vinylformamide or a monomer mixture of
(a) from 1 to 99% by weight of N-vinylformamide and
(b) from 99 to 1% by weight of vinyl acetate
and which are then subjected to hydrolysis in which from 2 to 100% of the formyl groups of the polymerized N-vinylformamide are eliminated from the graft polymer with formation of units of the formula III where $R^2$ is H. If graft polymers which contain N-vinylformamide and vinyl acetate as polymerized units are hydrolyzed, hydrolysis of the N-vinylformamide units is accompanied by hydrolysis of the polymerized vinyl acetate with elimination of acetic acid and formation of vinyl alcohol units in the graft polymer. The degree of hydrolysis of the vinyl acetate or of the other vinyl esters is from 2 to 100%, preferably from 30 to 95%. The hydrolysis of the acetate groups of the polymerized vinyl acetate leads to the formation of units of the formula

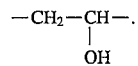

In order, during storage, to prevent or substantially suppress a decrease in the efficiency of the hydrolyzed polymers during use and to obtain a polymer solution having a substantially stable color, antioxidants, reducing agents or aldehyde acceptors may be added during or after the hydrolysis.

Antioxidants, which generally act as free radical acceptors or UV stabilizers are, for example, secondary aromatic amines, phenols, alkylphenols, thioethers, phosphites or mixtures of compounds of the stated classes. Examples of suitable secondary aromatic amines are 4,4'-bis-(tert-butyl)-diphenylamine, 4,4'-bis-(phenylmethyl)-diphenylamine or mixtures thereof. Alkylphenols which are suitable antioxidants are, for example, 2,6-dimethyl-4-tert-butylphenol, 2,4,6-trimethylphenol, 2,4-di-tert-butyl-6-methylphenol or mixtures thereof. Suitable thioethers are, for example, dialkyl 3,3'-thiodipropionate, poly-2,3-dimethylphenyl 1,4-disulfide, bis-(2-methyl-4-hydroxy-5-tert-butyl) sulfide, dibenzyl sulfide and dialkyl disulfides, eg. dioctadecyl disulfide.

Phosphites which are suitable antioxidants are, for example, trisnonyl phenyl phosphite, di-(2,4-di-tert-butylphenyl) pentaerythrityl diphosphite and diphenylene decyl phosphite.

Examples of suitable reducing agents are sodium borohydride, sodium cyanoborohydride and dithionites, such as sodium, potassium or zinc dithionite.

Examples of aldehyde acceptors are NH-containing compounds, such as urea, ethyleneurea, propyleneurea, melamine, guanidine, phenylbisguanidine or mixtures of the stated compounds. Other aldehyde acceptors are, for example, alkali metal bisulfites, such as sodium bisulfite or potassium bisulfite.

Antioxidants, reducing agents and aldehyde acceptors are each used in amounts of from 0.01 to 20, preferably from 0.1 to 16, % by weight, based on the polymers. These substances may be added before, during or after hydrolysis of the amide groups present in the graft polymers.

The resulting polymers modified with natural substances and containing N-vinylcarboxamide and/or vinylamine units are used in papermaking to increase the dry and wet strength of the paper. The novel graft polymers are preferably employed in aqueous solution and are added to the paper stock before sheet formation in an amount of from 0.1 to 10% by weight, based on dry fiber. The aqueous polymer solutions may also be applied to the surface of the paper, the amounts to be used being from 0.1 to 10, preferably from 0.25 to 3, % by weight, based on, dry fibers. The aqueous solutions of the polymers are effective for all known paper, board and cardboard qualities, for example for the production of hygiene, writing, printing and packaging papers. The papers or boards and cardboards may be produced from a large number of fiber materials, and may consist, for example, of sulfite or sulfate pulp (bleached or unbleached), groundwood, chemothermomechanical pulp (CTMP), thermomechanical pulp (TMP) or waste papers or mixtures of the stated fiber types. The pH of the stock suspension is from 4 to 9, preferably from 6 to 8. The copolymers described above are preferably added in an amount of from 0.25 to 2% by weight, based on dry fiber, to the paper stock suspension prior to sheet formation and result in an increase in the dry and wet strength of the paper.

In the Examples which follow, parts and percentages are by weight.

The paper sheets were produced on a Rapid-Köthen laboratory sheet former. The dry tear length was determined according to DIN 53,112, Sheet 1, and the wet tear length according to DIN 53,112, Sheet 2.

EXAMPLES

Example 1

In a heatable reactor equipped with a stirrer, a reflux condenser, a thermometer, feed apparatuses and nitrogen inlet and outlet apparatuses, 1,010 g of distilled water, 1.6 g of primary sodium phosphate and 47.6 g of 82.4% strength potato starch are heated to 70° C. in a gentle stream of nitrogen while stirring, and 160 g of N-vinylformamide are metered in over 2 hours and a solution of 0.98 g of 2,2'-azobis-(2-methylpropionamidine) dihydrochloride in 97.6 g of distilled water is metered in over 3 hours, uniformly at 70° C. Polymerization is then completed in the course of a further 3 hours at 70° C. The white highly viscous dispersion has a solids content of 15.3%.
Hydrolysis:
1,000 g of the dispersion described above (weight ratio of N-vinylformamide to potato=80:20) are initially taken in a flask provided with a stirrer, a reflux condenser, a thermometer and a feed apparatus. 182 g of 38% strength hydrochloric acid (=110 mol %, based on N-vinylformamide used) are added dropwise in the course of 15 minutes at room temperature. The reaction mixture is then heated at 70° C. for 8 hours while stirring, a degree of hydrolysis of 88.6% being achieved. The course of the reaction is monitored by polyelectrolyte titration. The brownish clear solution has an active ingredient content (based on the unhydrolyzed intermediate) of 12.8% by weight and a viscosity of 195 mPa.s at 28° C. (Brookfield).

Example 2

In a reactor equipped according to Example 1, 1,006.7 g of distilled water, 1.6 g of primary sodium phosphate and 72.5 g of 82.4% strength potato starch are heated to 70° C. in a gentle stream of nitrogen, and 142 g of N-vinylformamide are metered in over 2 hours and a solution of 0.7 g of 2,2'-azobis-(2-methylpropionamidine) dihydrochloride in 97.6 g of distilled water is metered in over 3 hours, uniformly at 70° C. Heating is then continued for a further 3 hours at 70° C. The resulting white, viscous dispersion has a solids content of 15.5%.

As described in Example 1, 400 g of this dispersion (weight ratio of N-vinylformamide to potato=70:30) are initially taken in a flask and 70.3 g of 38% strength hydrochloric acid (120 mol %, based on N-vinylformamide) are added dropwise in the course of 15 minutes. The mixture is then heated at 70° C. for 7 hours, 92.5% of the vinyl formamide units being hydrolyzed. The active ingredient content is 13.2% by weight.

Example 3

In a reactor equipped according to Example 1, 1,010 g of distilled water, 2.4 g of primary sodium phosphate and 97.1 g of 82.4% strength potato starch are heated to 70° C. in a gentle stream of nitrogen, and 120 g of N-vinylformamide are metered in over 2 hours and a solution of 0.98 g of 2,2'-azobis-(2-methylpropionamidine) dihydrochloride in 97.6 g of distilled water is metered in over 3 hours, uniformly at 70° C. Heating is then continued for a further 3 hours at 70° C. The highly viscous white dispersion has a solids content of 15.0%.

400 g of this dispersion (weight ratio of N-vinylformamide to potato=60:40) are initially taken in a flask according to Example 1, and 53.0 g of 38% strength hydrochloric acid (110 mol %, based on N-vinylformamide) are added dropwise in the course of 5 minutes. Heating is then carried out at 70° C. for 8 hours, a degree of hydrolysis of 90.0% resulted. The active ingredient content is 13.1% by weight.

Example 4

In a reactor equipped according to Example 1, 993.4 g of distilled water, 2 g of primary sodium phosphate and 121.5 g of 82.4% strength potato starch are heated to 70° C. in a gentle stream of nitrogen, and 102 g of N-vinylformamide are metered in over 2 hours and a solution of 0.5 g of 2,2'-azobis-(2-methylpropionamidine) dihydrochloride in 97.6 g of distilled water is metered in over 3 hours, uniformly at 70° C. Heating is then continued for a further 3 hours at 70° C. The viscous white dispersion has a solids content of 15.8%.

515 g of this dispersion (weight ratio of N-vinylformamide to potato=50:50) are initially taken in a flask according to Example 1. 65.9 g of 38% strength hydrochloric acid (120 mol %, based on N-vinylformamide) are added dropwise in the course of 15 minutes. Heating is then carried out at 70° C. for 8 hours, a degree of hydrolysis of 85.4% being achieved. The active ingredient content of the solution is 14.0% by weight.

Example 5

In a reactor equipped according to Example 1, 1,010 g of distilled water, 3.6 g of primary sodium phosphate and 40 g of maltodextrin having a DE value of 11–14 are heated toe 70° C. in a gentle stream of nitrogen, and 160 g of N-vinylformamide are metered in over 3 hours and a solution of 0.98 g of 2,2'-azobis-(2-methylpropionamidine) dihydrochloride in 95 g of distilled water is metered in over 4 hours, uniformly at 70° C. Heating is then continued for a further 2 hours at 70° C. The slightly turbid solution has a solids content of 14.6% and a K value of 60.

300 g of this solution (weight ratio of N-vinylformamide to maltodextrin=80:20) are initially taken in a flask according to Example 1. 56.8 g of 38% strength hydrochloric acid (120 mol %, based on N-vinylformamide) are added dropwise in the course of 15 minutes and heating is then continued at 70° C. for 3.5 hours while stirring. A degree of hydrolysis of 86.5% is reached. The solution has an active ingredient content of 12.3%.

Example 6

In a reactor equipped according to Example 1, 1,01.0 g of distilled water, 2.4 g of primary sodium phosphate and 80 g of maltodextrin having a DE value of 11–14 are heated to 70° C. in a gentle stream of nitrogen, and 120 g of N-vinylformamide are metered in over 2 hours and 0.98 g of 2,2'-azobis-(2-methylpropionamidine) dihydrochloride in 98 g of distilled water is metered in over 3 hours, uniformly at 70° C. Heating is then continued for a further 2 hours at 70° C. The slightly turbid, slightly viscous solution has a solids content of 15% and a K value of 61.2.

130 g of this solution (weight ratio of N-vinylformamide to maltodextrin=60:40) are initially taken in a flask according to Example 1. 17.4 g of 38% strength hydrochloric acid (120 mol %, based on N-vinylformamide) are added dropwise in the course of 15 minutes and the reaction mixture is then heated at 70° C. for 5.5 hours. The degree of hydrolysis is 97.3%. The solution has an active ingredient content of 13.1% by weight.

Example 7

In a reactor equipped according to Example 1, 990 g of distilled water, 2.4 g of primary sodium phosphate and 104.2 g of 76.8% strength glucose syrup are heated to 70° C. in a gentle stream of nitrogen, and 122.4 g of N-vinylformamide are metered in over 2 hours and a solution of 0.6 g of 2,2'-azobis-(2-methylpropionamidine) dihydrochloride in 95 g of distilled water is metered in over 3 hours, uniformly at 70° C. Heating is then continued for a further 3 hours at 70° C. The clear, viscous solution has a solids content of 15.3% and a K value of 65.8.

300 g of this solution (weight ratio of N-vinylformamide to glucose=60:40) are initially taken in a flask according to Example 1. 44.6 g of 38% strength hydrochloric acid (120 mol %, based on N-vinylformamide) are added dropwise in the course of 15 minutes and heating is then continued at 70° C. for a further 10 hours. A degree of hydrolysis of 92.3% is obtained. The active ingredient content is 13.5% by weight.

Example 8

In a reactor equipped according to Example 1, 996 g of distilled water, 1.4 g of primary sodium phosphate and 78.1 g of 76.8% strength glucose syrup are heated to 70° C. in a gentle stream of nitrogen, and 142 g of N-vinylformamide are metered in over 2 hours and a solution of 0.7 g of 2,2'-azobis-(2-methylpropionamidine) dihydrochloride in 95 g of distilled water is metered in over 3 hours, uniformly at 70° C. Heating is then continued for a further 3 hours at 70° C. The clear, colorless, viscous solution has a solids content of 15.7% and a K value of 71.7.

315 g of this solution (weight ratio of N-vinylformamide to glucose=70:30) are initially taken in a flask according to Example 1. 51.4 of 38% strength hydrochloric acid (110 mol %, based on N-vinylformamide) are added dropwise in the course of 15 minutes at room temperature. Heating is then carried out at 70° C. for 10 hours, a degree of hydrolysis of 88% being established. The active ingredient content is 13.5% by weight.

Example 9

In a reactor equipped according to Example 1, 1,010 g of distilled water, 1.6 g of primary sodium phosphate and 44.6 g of 88% strength cationic starch (Cato 50) are heated to 70° C. in a gentle stream of nitrogen, and 160 g of N-vinylformamide are metered in over 2 hours and a solution of 0.98 g of 2,2'-azobis-(2methylpropionamidine) dihydrochloride in 95 g of distilled water is metered in over 3 hours, uniformly at 70° C. Heating is then continued for a further 3 hours at 70° C. The white, viscous dispersion has a solids content of 15%.

400 g of this dispersion (weight ratio of N-vinylformamide to cationic starch=80:20) are initially taken in a flask according to Example 1. 72.8 g of 38% strength hydrochloric acid (110 mol %, based on N-vinylformamide) are added dropwise in the course of 15 minutes at room temperature. The reaction mixture is heated at 70° C. for 6.5 hours, a degree of hydrolysis of 91.7% being established. The active ingredient content of the solution is 12.8%.

Example 10

In a reactor equipped according to Example 1, 1,010 g of distilled water, 2.4 g of primary sodium phosphate and 91 g of 88% strength cationic starch (Cato 50) are heated to 70° C. in a gentle stream of nitrogen, and 120 g of N-vinylformamide are metered in over 2 hours and a solution of 0.98 g of 2,2'-azobis-(2-methylpropionamidine) dihydrochloride in 95 g of distilled water is metered in over 3 hours, uniformly at 70° C. Heating is then continued for a further 3 hours at 70° C. The white, viscous dispersion has a solids content of 15.3%.

400 g of this dispersion (weight ratio of N-vinylformamide to cationic starch=60:40) are initially taken in a flask according to Example 1. 54.6 g of 38% strength hydrochloric acid (110 mol %, based on N-vinylformamide) are added dropwise at room temperature in the course of 15 minutes and heating is then carried out at 70° C. for 7 hours. A degree of hydrolysis of 90.8% is obtained. The active ingredient content of the solution is 13.5% by weight.

Example 11

In a reactor equipped according to Example 1, 626 g of distilled water, 3 g of primary sodium phosphate, 145.6 g of 82.3% strength potato starch and 2.3 g of a 30% strength solution of the sodium salt of a molar copolymer of styrene and maleic acid having a weight average molecular weight of 100,000 g/mol are heated to 65° C. in a gentle stream of nitrogen. 54 g of vinyl acetate are metered in over 2 hours at 65° C., 128 g of N-vinylformamide are metered in over 3 hours and a solution of 0.4 g of 2,2'-azobis-(2-methylpropionamidine) dihydrochloride in 50 g of distilled water is metered in over 4 hours, metering being effected uniformly. Heating is then continued for a further 2 hours at 65° C. 0.2 g of azobisisobutyronitrile is then added and heating is continued for about a further 2 hours until a boiling point of 85° C. is reached. About 10 g of unconverted vinyl acetate are then distilled off. The white, highly viscous dispersion has a solids content of 22.5%.

270 g of this dispersion (graft polymer of N-vinylformamide and vinyl acetate of potato starch in a weight ratio of 42:18:40) are initially taken in a flask according to Example 1. 90.7 g of 38% strength hydrochloric acid (200 mol %, based on N-vinylformamide) are added dropwise at room temperature in the course of 15 minutes and heating is then carried out at 70° C. for 6 hours. An intermediate precipitate is dissolved again by adding 19 g of water. The degree of hydrolysis of the vinylformamide is 78.9% and that of the vinyl acetate is 54.2%. The solution has an active ingredient content of 16.0% by weight.

Comparative Examples

Polymer 1

32 g of potato starch are mixed with 500 g of a 15% strength aqueous polyvinylformamide solution (K value 85). After the starch has been completely mixed in, 121 g (120 mol %, based on N-vinylformamide) of 38% strength hydrochloric acid are added dropwise in the course of 10 minutes, after which stirring is effected for a further 15 minutes at room temperature and finally heating is carried out at 70° C. for 6 hours. The end point of the reaction (degree of hydrolysis 95%) is determined by polyelectrolyte titration. A clear brownish solution having an active ingredient content of 16.4% by weight is obtained, said solution being used according to EP-A-0 301 372 as a dry and wet strength agent for paper.

Polymer 2

74 g of 38% strength hydrochloric acid (120 mol %, based on N-vinylformamide) are added dropwise to 300 g of a 15.3% strength aqueous polyvinylformamide solution (K value of the polymer is 85). The mixture is then heated at 70° C. for about 5 hours. The degree of hydrolysis (>93%) is monitored by polyelectrolyte titration. After cooling, the pH of the solution is increased to 3.5 with 50% strength sodium hydroxide solution (40.6 g). The polymer content of the solution is 10.9%.

Polymer 3

A copolymer of 70% by weight of N-vinylformamide and 30% by weight of vinyl acetate, having a K value of 85, is prepared according to U.S. Pat. No. 4,978,427 and is hydrolyzed by adding 110 mol of a 38% strength hydrochloric acid per mol of N-vinylformamide in the polymer until not less than 90% of polymerized N-vinylformamide and not less than 80% of the polymerized vinyl acetate have been hydrolyzed.

Use Examples

In order to test the efficiency of the graft polymers described above and of the prior art polymers as dry and wet strength agents, in each case 1%, based on the solids, of the polymers described are added to a paper stock which consists of 50% of spruce sulfite pulp and 50% of beech sulfite pulp. The consistency of this pulp is 0.5%, and the pH 7.5 and the freeness 30° SR (Schopper/Riegler). The pulps obtained are then drained on a Rapid-Köthen sheet former to give sheets having a basis weight of 80 g/m². The dry and wet tear lengths stated in the Table below are measured for the above-mentioned polymers.

TABLE

| Example | Graft polymer according to Example | Dry tear length [m] | Wet tear length [m] |
| --- | --- | --- | --- |
| 12 | 1 | 3055 | 665 |
| 13 | 2 | 2733 | 716 |
| 14 | 3 | 2879 | 573 |
| 15 | 4 | 2511 | 515 |
| 16 | 5 | 2999 | 679 |
| 17 | 6 | 2730 | 596 |
| 18 | 7 | 2572 | 536 |
| 19 | 8 | 2569 | 595 |
| 20 | 9 | 2617 | 595 |
| 21 | 10 | 2801 | 562 |
| 22 | 11 | 2792 | 575 |
| Comparative Example 1 | | 2456 | 449 |
| Comparative Example 2 | | 2440 | 502 |
| Comparative Example 3 | | 2478 | 515 |

We claim:

1. A polymer prepared by free radical polymerization of monomers selected from the group consisting of (A) and (B), wherein (A) monomers or a monomer mixture of (a) from 10–100% by weight of N-vinyl carboxamides of the formula

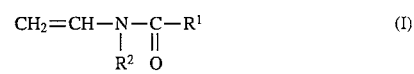

wherein $R^1$ and $R^2$ are each H or $C_1$–$C_6$-alkyl, (b) 0–90% by weight of other carboxyl-free monoethylenically unsaturated monomers which are copolymerizable with monomers (a), said carboxyl-free monoethylenically unsaturated monomers selected from the group consisting of vinyl esters of $C_1$–$C_6$-saturated carboxylic acids, esters of monoethylenically unsaturated $C_3$–$C_6$-carboxylic acids, amides of monoethylenically unsaturated $C_3$–$C_6$-carboxylic acids, nitriles of monoethylenically unsaturated $C_3$–$C_6$-carboxylic acids, N-vinylpyrrolidone, N-vinylcaprolactam, acrylonitrile, methacrylonitrile, N-vinylimidazole, substituted N-vinylimidazoles, N-vinylimidazolines, vinyl sulfonic acid, allyl sulfonic acid, methallyl sulfonic acid, styrene sulfonic acid, 3-sulfopropyl acrylate, 3-sulfopropyl methacrylate and 2-acrylimido-2-methyl-propane sulfonic acid, and (c) 0–5% by weight of monomers containing two or more ethylenically unsaturated, non-conjugated double bond; wherein a+b+c=100%, are polymerized in the presence of (B) a compound selected from the group consisting of monosaccharides, oligosaccharides, polysaccharides, oxidatively, hydrolytically or enzymatically degraded polysaccharides, oxidized hydrolytically degraded or oxidized enzymatically degraded polysaccharides, chemically modified mono-, oligo, or polysaccharides selected from the group consisting of phosphated starch, acetylated starch, starch alkyl ethers, starch hydroxyalkyl ethers, starch carboxyalkyl ethers, starch allyl ethers, cationically modified starches, hydrogenation products of starch hydrolysis products, carboxymethylcellulose, hydroxyethylcellulose, hydroxypropylcellulose, carboxymethyl-hydroxyethylcellulose, sulfoethylcellulose, carboxymethyl-sulfoethylcellulose, hydroxypropylsulfoethylcellulose, hydroxyethylsulfoethylcellulose, methylsulfoethylcellulose and ethylsulfoethylcellulose, and mixtures thereof;

in a monomer weight ratio (A):(B) of from 95:5 to 20:80 to form a polymer having a K-value of 8–250 measured in a 1% strength solution of said polymer at pH 7 and at 25° C., said polymer containing 10% by weight or more of units of the formula

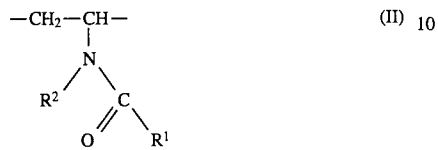 (II)

wherein $R^1$ and $R^2$ are each H or $C_1$–$C_6$-alkyl.

2. The graft polymer of claim 1, wherein the weight ratio (A):(B) is from 60:40 to 20:80.

3. The graft polymer of claim 1, wherein said graft polymer has a K value of 8–250 measured in a 1% strength aqueous solution of said polymer at pH 7 and at 25° C.

4. The graft polymer of claim 3, wherein said K value is from 10–150 measured in a 1% strength aqueous solution of said polymer at pH 7 and at 25° C.

5. The graft polymer of claim 1, wherein said N-vinylcarboxamide is N-vinylformamide.

6. The graft polymer of claim 1, wherein said K value is from 10–150 measured in a 1% strength aqueous solution of said polymer at pH 7 and at 25° C.

7. A polymer prepared by free radical polymerization of monomers selected from the group consisting of (A) and (B), wherein (A) monomers or a monomer mixture of
 (a) from 10–100% by weight of N-vinyl carboxamides of the formula

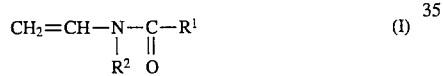 (I)

wherein $R^1$ and $R^2$ are each H or $C_1$–$C_6$-alkyl (b) 0–90% by weight of other carboxyl-free monoethylenically unsaturated monomers which are copolymerizable with monomers (a), said carboxyl-free monoethylenically unsaturated monomers selected from the group consisting of vinyl esters of $C_1$–$C_6$-saturated carboxylic acids, esters of monoethylenically unsaturated $C_3$–$C_6$-carboxylic acids, amides of monoethylenically unsaturated $C_3$–$C_6$-carboxylic acids, nitriles of monoethylenically unsaturated $C_3$–$C_6$-carboxylic acids, N-vinylpyrrolidone, N-vinylcaprolactam, acrylonitrile, methacrylonitrile, N-vinylimidazole, substituted N-vinylimidazoles, N-vinylimidazolines, vinyl sulfonic acid, allyl sulfonic acid, methallyl sulfonic acid, styrene sulfonic acid, 3-sulfopropyl acrylate, 3-sulfopropyl methacrylate and 2-acrylimido-2-methyl-propane sulfonic acid, and (c) 0–5% by weight of monomers containing two or more ethylenically unsaturated, non-conjugated double bond; wherein a+b+c=100%, are polymerized in the presence of (B) a compound selected from the group consisting of monosaccharides, oligosaccharides, polysaccharides, oxidatively, hydrolytically or enzymatically degraded polysaccharides, oxidized hydrolytically degraded or oxidized enzymatically degrade polysaccharides, chemically modified mono- oligo, or polysaccharides selected from the group consisting of phosphated starch, acetylated starch, starch alkyl ethers, starch hydroxyalkyl ethers, starch carboxyalkyl ethers, starch allyl ethers, cationically modified starches, hydrogenation products of starch hydrolysis products, carboxymethylcellulose, hydroxyethylcellulose, hydroxypropylcellulose, carboxymethyl-hydroxyethylcellulose, sulfoethylcellulose, carboxymethyl-sulfoethylcellulose, hydroxypropylsulfoethylcellulose, hydroxyethylsulfoethylcellulose, methylsulfoethylcellulose and ethylsulfoethylcellulose, and mixtures thereof;

in a monomer weight ratio (A):(B) of from 95:5 to 20:80 to form a polymer having a K-value of 8–250 measured in a 1% strength solution of said polymer at pH 7 and at 25° C., said polymer containing 10% by weight or more of units of the formula

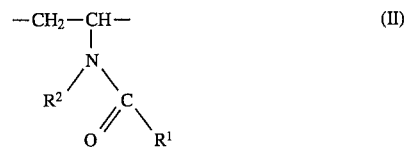 (II)

wherein $R^1$ and $R^2$ are each H or $C_1$–$C_6$-alkyl, wherein said polymerization is followed by hydrolysis of 2 to 100% of the carboxamide groups of the graft polymer to form units of the formula

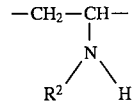

wherein $R^2$ is H or $C_1$–$C_6$-alkyl.

8. The graft polymer of claim 7, wherein said N-vinylcarboxamide is N-vinylformaide.

9. The graft polymer of claim 7, wherein the weight ratio (A):(B) is from 60:40 to 20:80.

10. The graft polymer of claim 7, wherein said polymerization is followed by hydrolysis of 2 to 97.3% of the carboxamide groups.

11. The graft polymer of claim 10, wherein said polymerization is followed by hydrolysis of 30–95% of the carboxamide groups.

12. The graft polymer of claim 10, wherein said N-vinylcarboxamide is N-vinylformamide.

* * * * *

UNITED STATES PATENT AND TRADEMARK OFFICE
CERTIFICATE OF CORRECTION

PATENT NO. : 5,578,678
DATED : November 26, 1996
INVENTOR(S) : Heinrich HARTMANN, et al.

It is certified that error appears in the above-indentified patent and that said Letters Patent is hereby corrected as shown below:

On the title page, Item [*], the Terminal Disclaimer should read:

--The term of this patent shall not extend beyond the expiration date of Patent No. 5,334,287.--

Signed and Sealed this

Eighteenth Day of February, 1997

Attest:

BRUCE LEHMAN

*Attesting Officer*  *Commissioner of Patents and Trademarks*